April 12, 1966 W. L. WEAKLEND 3,246,313
GRAIN TANK EXTENSION AND SIGNAL DEVICE
Filed Sept. 27, 1962 2 Sheets-Sheet 1

INVENTOR.
WALTER L. WEAKLEND
BY
Frishburn and Gold
ATTORNEYS

April 12, 1966    W. L. WEAKLEND    3,246,313
GRAIN TANK EXTENSION AND SIGNAL DEVICE
Filed Sept. 27, 1962    2 Sheets-Sheet 2
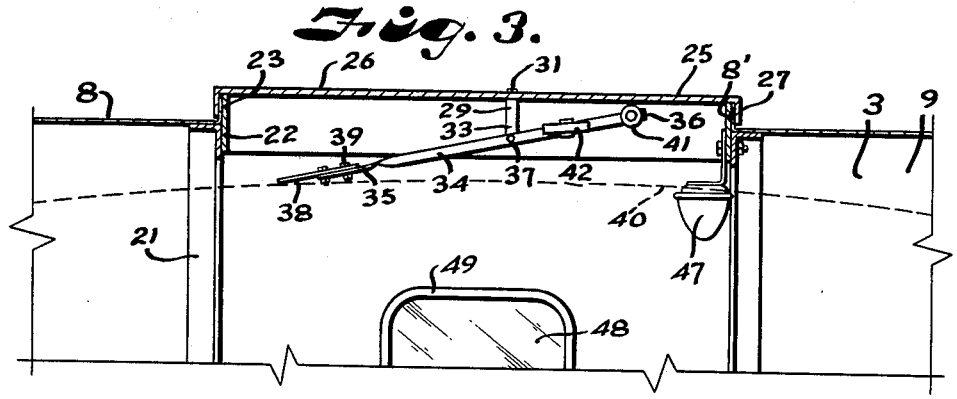
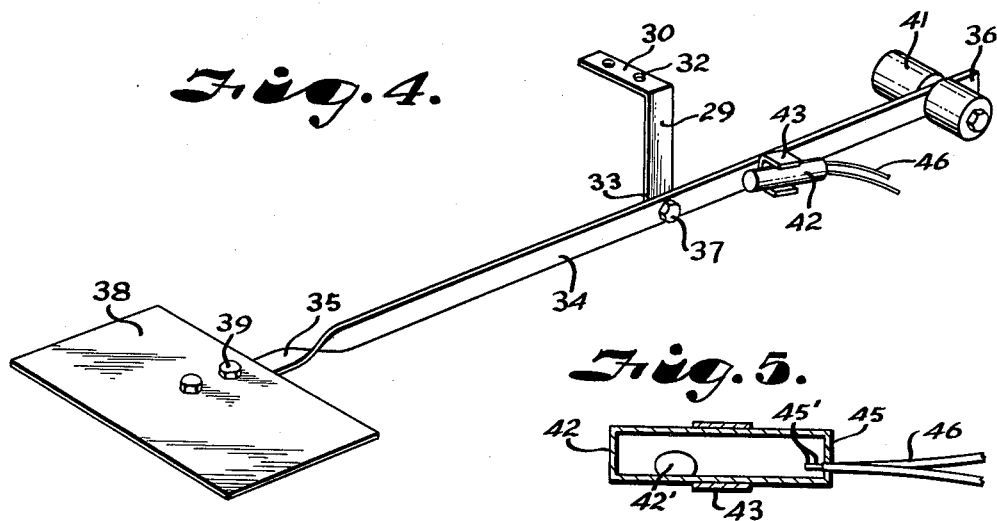
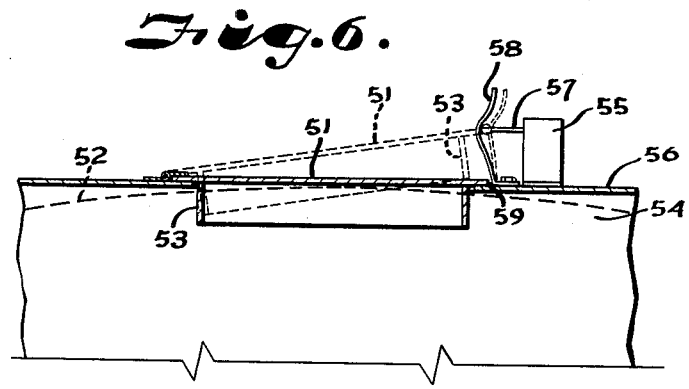
INVENTOR.
WALTER L. WEAKLEND
BY
Fishburn and Gold
ATTORNEYS United States Patent Office 3,246,313
Patented Apr. 12, 1966

3,246,313
GRAIN TANK EXTENSION AND SIGNAL DEVICE
Walter L. Weaklend, R.R. 1, Smithville, Mo.
Filed Sept. 27, 1962, Ser. No. 226,536
5 Claims. (Cl. 340—246)

This invention relates to harvesting apparatus and more particularly to a grain tank enclosing extension for assembly with normally open combine grain tanks.

In harvesting grain with combines serious problems are often presented due to the normally open top grain tanks into which the harvested material is inserted by the combine machinery. Such open top tanks are usually limited in volume capacity to the corresponding weight of harvested grain which can be easily hauled by the combine in a soft or muddy field. This limited capacity results in an unnecessarily excessive number of stops for unloading when the ground is hard and firm, lengthening the time and increasing the effort which would otherwise be required to harvest the crop. Further inclement weather during harvesting results in moisture, in the form of rain, sleet or snow, mixing with the harvested grain in the open tanks and excessively increasing the moisture content thereof which promotes rotting and spoilage. In addition, such moisture often drains down through the grain during idle periods and freezes, preventing the subsequent operation of the combine without first building a fire therebeneath or otherwise heating the combine structure to induce thawing and draining. Further, when it becomes necessary to run the combine over rough terrain with a full grain tank, spilling often results with consequent waste. Still further, since the grain rises in the tank with the center higher than the outer edges and an open tank provides no convenient reference point, it is difficult to estimate equal loads of grain which materially interferes with dividing the grain into equal shares.

The principal objects of the present invention are: to provide a grain tank enclosing extension for assembly with the normally open grain tank of a combine for significantly increasing the capacity thereof when such increase is desired; to provide such a device which protects harvested grain and combine machinery against damage and interference due to moisture entering the normally open grain tank; to provide such a tank extension which eliminates the necessity of draining rain water or thawing ice from the bottom of the combine grain tank; to provide such a device which prevents the spilling of grain from a full tank; to provide such an enclosing extension in combination with a signaling device for indicating when the combine grain tank and extension are full; to provide such a grain tank signaling device which is adjustable for signaling the attainment of a predetermined partial load to limit combine weight in a soft or muddy field; to provide such signaling apparatus which is accurately repeatable so that an accurately predetermined amount of grain is obtained for each combine load; to provide such a grain tank enclosing and extending apparatus wherein an illuminated tank interior may be viewed by the combine operator through a conveniently located window; to provide such apparatus having a port covering door which may be conveniently opened for adjusting cleaning or maintenance purposes; and to provide such a device which is simple in construction, inexpensive to build and highly reliable in use.

Other objects and advantages of this invention will become apparent from the following description taken in connection with the accompanying drawings, wherein are set forth by way of illustration and example certain embodiments of this invention.

FIG. 3 is a fragmentary vertical cross-sectional view on an enlarged scale through the grain tank extension particularly showing a signal device for indicating a desired grain load.

FIG. 4 is a perspective view on an enlarged scale of the signal device showing details thereof.

FIG. 5 is a fragmentary cross-sectional view on an enlarged scale through a tilt switch forming a part of the signal device of FIG. 4.

FIG. 6 is a fragmentary vertical cross-sectional view through another embodiment of a grain tank extension showing an access door and signal device.

Figure 1:
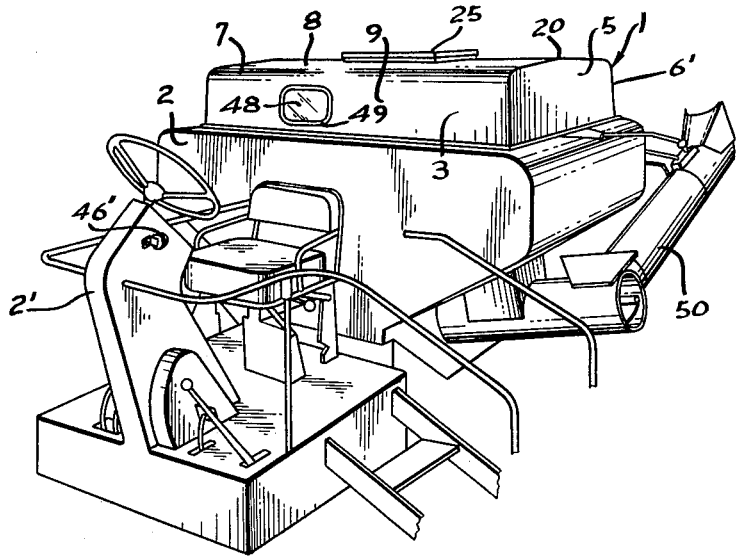
FIG. 1 is a fragmentary perspective view of a combine with a grain tank enclosing extension embodying this invention assembled therewith.

Referring to the drawings in more detail:

The reference numeral 1 generally indicates a grain tank enclosing extension and signal device assembled with a normally upwardly open grain tank 2 of a grain harvesting combine 2'. The device 1, in the illustrated example, includes vertically extending oppositely disposed side walls 3 and 4 and vertically extending oppositely disposed end walls 5 and 6 connected at lateral vertical edges 6' thereof to form a substantially rectangular structure. The walls 3, 4, 5 and 6 are connected at the upper edges 7 thereof to a generally horizontally extending top wall 8 forming therewith a downwardly opening container 9. The lower edges 10 of the walls 3, 4, 5 and 6 are secured to suitable angles 11 having outwardly extending legs 12 forming peripheral flanges 13 adapted to engage the upper edges 14 of the combine grain tank 2. Spaced aligned bores 14' extend through the flanges 13 and upper edges 14 and receive suitable bolts 15 which are engaged with nuts 16 for securing the container 9 in upwardly extending relation with respect to the grain tank 2. A suitable plastic gasket compound is preferably inserted between the flanges 13 and upper edges 14 at 17 to insure that a grain tight seal is provided therebetween.

The top wall 8 is comprised of two substantially planar sections 18 and 19 which slope with respect to each other causing the top wall 8 to gently taper upwardly to a central peak 20 extending parallel to the side walls 3 and 4 and terminating at the end walls 5 and 6. The top wall taper approximates the shape of the grain pile which rises in the tank 2. Suitable spaced angles 21 are secured to the respective side walls 3 and 4 and top wall 8 for rendering the container 9 sufficiently rigid for its intended purpose without significantly adding to the weight thereof.

Elongated framing members 22 are secured to the top wall 8, preferably by welding at 8', and form with bent-up portions of the top wall 8 lips 23 which extend upwardly from the top wall 8. The framing members 22 outline or define a hatch opening 24 located centrally of the top wall 8 providing access into the space enclosed by the container 9 and grain tank 2.

Figure 2:
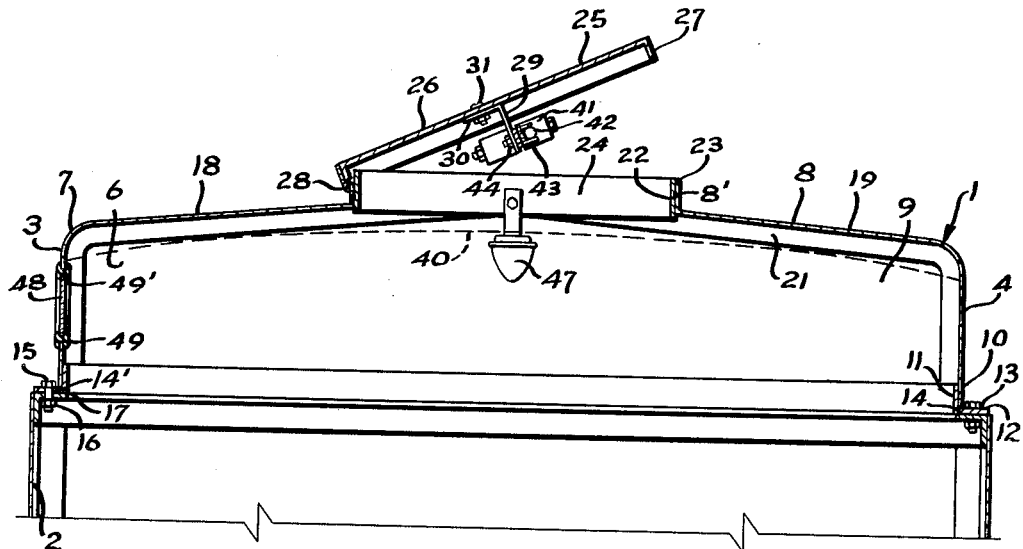
FIG. 2 is a fragmentary vertical cross-sectional view on an enlarged scale through the grain tank enclosing extension and a portion of the combine grain tank particularly showing the tank extension access door.

A door 25 is comprised of a cover plate 26 dimensioned to rest on the upper edges of the lips 23 and cover the opening 24. The cover plate 26 has depending lips 27 adapted to extend in overlapping relation with the upwardly extending lips 23 when the door 25 is closed for improving the closure. The door 25 is hingedly secured at 28 adjacent one of the lips 23 for selectively opening upwardly of the top wall, FIG. 2. The door 25 is normally maintained in a closed position as shown in FIG. 1 and remains closed due only to the weight thereof.

A depending bracket 29 has a laterally extending upper end or foot 30 secured to the cover plate 26, in the illustrated example, by means of suitable screws 31 extending through the cover plate and through receiving bores 32 in the foot 30. The bracket 29 has a lower end 33 which extends, when the door 25 is closed, into the container 9. An elongated balanced arm 34 includes a front end portion 35 and a rear end portion 36. The balance arm 34 is pivotally connected by a suitable bolt 37 to the bracket lower end 33 intermediate the front and rear end portions 35 and 36, FIG. 4.

The front end portion 35 of the balance arm 34 has a generally horizontally extending grain contacting platform float member 38 secured thereto by suitable bolts 39. The platform float member 38 has a surface area sufficient to "float" on the top of a grain pile 40 rising in the grain tank 2 and into the container 9 as the combine is operated in the field. The rear end portion 36 of the balance arm 34 has a weight or load member 41 secured thereto, the load member having a weight sufficient to only partially balance the float member 38 whereby the arm 34 is normally tilted in a direction wherein the float member 38 is lowermost, FIG. 3. The arm 34 is balanced to the extent that very little force is required to raise the float member 38, however, the arm is relatively insensitive to the normal swing and shock loads produced by driving the combine over rough terrain.

A switch which is operatively responsive to tilting, in the illustrated example, a mercury switch 42 is secured to the balance arm 34 intermediate the bracket lower end 33 and the rear end portion 36. The switch 42 is secured by a spring slip 43 which is adjustably, pivotally connected to the balance arm 34 by means of a bolt and nut 44. By adjusting the angle of tilt of the switch 42 with respect to the arm 34 various alternative positions of the float member 38 may be obtained for actuation of the switch 42 which results from a shift of mercury 42′ contained therein. Thus, if it is desired to close the switch 42 when the float member 38 is in a relatively low position, the switch 42 is tilted so that the actuating end 45 containing mercury contacting terminals 45′ is relatively lower with respect to the arm 34.

The switch 42 is suitably connected by means of electrical wires 46 to a signal device 46′ which may take the form of a buzzer, flashing light or the like preferably located on or near the steering column of the combine for easily attracting the attention of the driver. Power for the signal device 46′ may be obtained in a conventional manner through the regular electrical system of the combine (not shown) or a separate battery power system (not shown) as desired.

A suitable illuminating lamp 47 is secured to a framing member 22 and extends within the container 9 for lighting the interior thereof. A window pane 48 is secured by means of a grain tight rubber seal 49 in an opening 49′ extending through the side wall 3 facing the driver's station on the combine. The combine operator, by merely turning his head, may look through the window 48 and with the help of the lamp 47 observe the condition and height of the grain within the grain tank 2 and container 9.

In operation, the grain pile 40 rises upwardly within the grain tank 2 and container 9 until it contacts the float member 38. As the grain continues to rise the float member 38 is forced upwardly until the switch 42 is tilted to the extent that actuation occurs which causes the energizing of the signal device 46′. The combine operator may then proceed to empty the container 9 and grain tank 2 by any suitable means, in the illustrated example a conventional auger 50 having a portion extending into the bottom of the grain tank 2.

A significantly greater quantity of grain may be contained in both the grain tank 2 and container 9 than in the tank 2 alone and such grain is protected by the container 9 against inclusion of moisture therewith from the outside and against spilling from the otherwise open top of the grain tank 2. By raising the door 25, which withdraws the balance arm 34, the switch may be tilted so that the signal will occur at a different grain height level within the container 9 or grain tank 2, for example, when load weight must be limited due to muddy conditions or unusually soft soil. The loads obtained on a predetermined setting of the switch 42 are highly uniform, facilitating the accurate division of the crop.

Referring to FIG. 6 an additional embodiment of this invention is illustrated wherein a tank extension door 51 is bodily raised by the grain pile 52. The door 51 has depending lips 53 to prevent the escape of grain from the enclosure 54 when the door 51 is partially raised. A suitable switch 55 is mounted on the top wall 56 and is of the type actuated by the depression of an extending arm 57. A spring clip 58 is secured to the top wall 56 in contact with the arm 57 and is adapted to interfere with the front edge 59 of the door 51 as the door is raised by the grain pile 52. The interference between the front edge 59 and clip 58 causes a displacement of the arm 57, actuating the switch 55 to produce a signal in the manner and for the purpose described above.

It is to be understood that while certain forms of this invention have been illustrated and described it is not to be limited to the specific form or arrangement of parts herein described and shown except insofar as such limitations are included in the claims.

What I claim and desire to secure by Letters Patent is:

1. In a combine having an elevated grain tank with opposed upright side and end walls terminating in an upper flange edge forming an upwardly facing surface extending around and defining an open top of the tank, the improvement of which comprises:
    (a) an extension and closure structure for assembly on said upper flanged end of said grain tank,
    (b) said extension and closure structure having opposed side and end walls terminating in a lower edge with a downwardly facing surface for securing in graintight engaged relation to the upper surface of the walls of the grain tank whereby said side and end walls of the extension and closure structure extend upwardly from corresponding side and end walls of the grain tank,
    (c) a generally horizontal top wall connected to said extension structure side and end walls at upper ends thereof and upwardly spaced from said downwardly facing surfaces to define the height of the extension structure and increase capacity of the extended grain tank, said top wall closing the extension structure and having an access opening therein, lips extending upwardly on said top wall and defining said access opening,
    (d) and a door hinged on said top wall at one side of said access opening and swingable from open to closed positions, said door having margins engaging portions of said top wall lips defining the access opening when the door is in closed position.

2. An extension structure as set forth in claim 1 and including:
    (a) a signal means,
    (b) and arm means swingably mounted on said extension structure and having a portion inside thereof adjacent the access opening and movable in response to rise of grain level therein for actuating said signal means when the grain level reaches a predetermined height therein.

3. An extension structure as set forth in claim 1 and including:
    (a) an electric circuit including a signal means therein,
    (b) a balance arm pivotally mounted on said extension structure and tiltable in response to rise of grain level therein,
    (c) a tilt actuated switch secured to said balance arm for tilting therewith in response to rise of grain level in said extension structure, said tilt switch being connected in said circuit and normally interrupting same and operative to complete said electric circuit to energize said signal means when the grain level reaches a predetermined height in the extension structure.

4. An extension structure as set forth in claim 3 wherein:
(a) the balance arm is pivotally mounted intermediate ends thereof with one end portion extending in one direction from the pivotal mounting and a second end portion extending in the opposite direction,
(b) a grain contacting float member secured to one end portion of the balance arm,
(c) a load member secured to the second balance arm portion and providing a weight sufficient to only partially balance said float member so that said arm is normally tilted with said float member lowermost and rises with the grain level in the extension structure.

5. An extension structure as set forth in claim 4 wherein:
(a) said switch means is adjustably connected to the balance arm and the tlit of said switch with respect to said arm is adjustable to adjust the predetermined height at which the switch completes the circuit.

References Cited by the Examiner

UNITED STATES PATENTS

| | | | |
|---|---|---|---|
| 1,453,668 | 5/1923 | Goin et al. | 220—85 |
| 1,489,938 | 4/1924 | Hale | 116—71 X |
| 1,591,591 | 7/1926 | Waderlow | 220—24 |
| 1,630,393 | 5/1927 | Ledden | 220—32 X |
| 1,854,680 | 4/1932 | Walker | 220—32 |
| 2,162,446 | 6/1939 | Scott | 220—32 X |
| 2,400,278 | 5/1946 | Wisely | 200—84.2 |
| 2,470,553 | 5/1949 | Gudmundsson | 200—84 |
| 2,627,244 | 2/1953 | Herigstad | 340—246 X |
| 2,646,476 | 7/1953 | Landry | 340—245 X |
| 2,671,573 | 3/1954 | Hendon et al. | 220—5 |
| 2,719,196 | 9/1955 | Wright | 200—84 |
| 2,794,880 | 6/1957 | Carothers | 200—84 |
| 2,816,973 | 12/1957 | Beck et al. | 340—244 X |
| 2,843,693 | 7/1958 | Scriver | 200—61.04 X |
| 2,851,553 | 9/1958 | Grostick | 340—246 X |

FOREIGN PATENTS 884,558    8/1943    France.

NEIL C. READ, *Primary Examiner.*

D. K. MYER, *Assistant Examiner.*